United States Patent
Marcos et al.

(10) Patent No.: US 6,262,729 B1
(45) Date of Patent: *Jul. 17, 2001

(54) METHOD AND APPARATUS FOR BINDING USER INTERFACE OBJECTS TO APPLICATION OBJECTS

(75) Inventors: Paul Marcos, Cupertino; Arnaud Weber, Sunnyvale; Avie Tevanian, Palo Alto; Rebecca Eades Willrich; Stefanie Herzer, both of Menlo Park; Craig Federighi, Mountain View, all of CA (US)

(73) Assignee: Apple Computer, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/834,157

(22) Filed: Apr. 14, 1997

(51) Int. Cl.[7] .................... G06F 3/00; G06F 9/54
(52) U.S. Cl. .................... 345/335; 345/333; 345/339; 709/332; 709/328
(58) Field of Search .................... 345/333, 335, 345/339, 340, 346, 968; 395/200.48, 682, 683, 701; 707/104, 501; 709/218, 302, 303, 315, 328, 331, 332

(56) References Cited

U.S. PATENT DOCUMENTS

| | | | |
|---|---|---|---|
| 5,121,477 | * | 6/1992 | Koopmans et al. .................. 345/333 |
| 5,555,365 | * | 9/1996 | Selby et al. .......................... 345/335 |
| 5,708,825 | * | 1/1998 | Sotomayor .......................... 707/501 |
| 5,724,595 | * | 3/1998 | Gentner .............................. 707/501 |
| 5,761,656 | * | 6/1998 | Ben-Shachar ........................ 707/4 |
| 5,761,673 | * | 6/1998 | Bookman et al. .................... 707/104 |
| 5,844,554 | * | 12/1998 | Geller et al. ........................ 345/333 |
| 5,848,246 | * | 12/1998 | Gish ................................ 395/200.58 |

FOREIGN PATENT DOCUMENTS

| | | |
|---|---|---|
| 0657808 | 6/1995 | (EP) . |
| 9806033 | 2/1998 | (WO) . |

OTHER PUBLICATIONS

Michael Moeller, "Net applications go real time: turn static Web pages into dynamic hosing environments", Product Announcement, pp. 1, and 2, Dec. 1995.*
Hillary Rettig, "WebObjects Wows'Em—VARs celebrate NeXT's merger of objects and the World Wide Web", VARBUSINESS, pp. 1, and 2, Apr. 1996.*
Larry Aronson, "HTML3 Manuel of Style", Macmillan Computer Publishing USA, pp. 112, 117–118, 1995.*
"Expose Connection List as Property" IBM Technical Disclosure Bulletin, vol. 37, No. 8, Aug. 1, 1994, p. 433 XP000456480.
Dobson R: "Scriptlets simplified" Byte (International Edition), vol. 23, No. 4, Apr. 1998, pp. 55–56, XP002081798.

* cited by examiner

Primary Examiner—Raymond J. Bayerl
Assistant Examiner—X. L. Bautista
(74) Attorney, Agent, or Firm—The Hecker Law Group

(57) ABSTRACT

A graphical user interface (GUI) and accompanying functionality for binding Web page definitional elements to a back-end state (e.g., client- or server-side back-end state) and custom logic is provided. In one embodiment, a template containing definitional elements, custom logic, and bindings are generated that define all or a portion of a Web page based on input received and functionality provided by the invention.

26 Claims, 12 Drawing Sheets

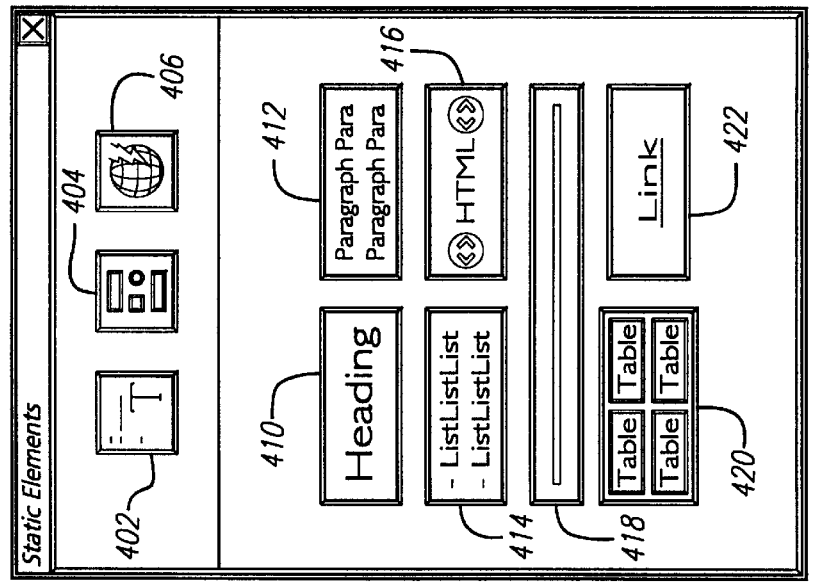
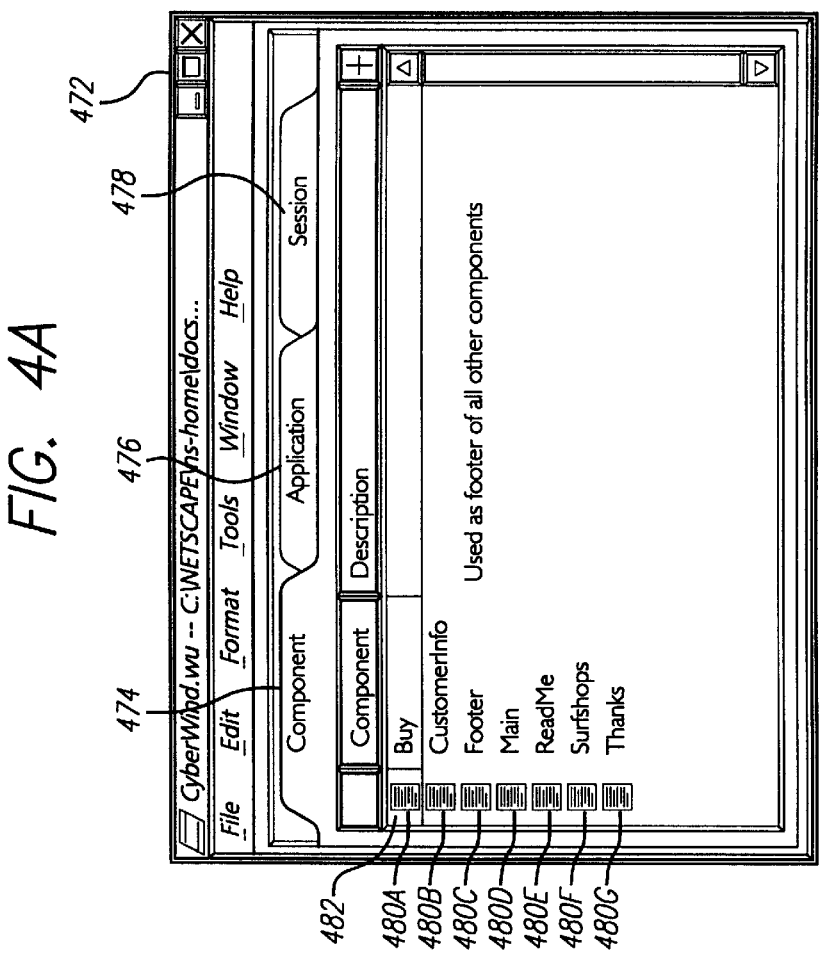
FIG. 4A
FIG. 4B

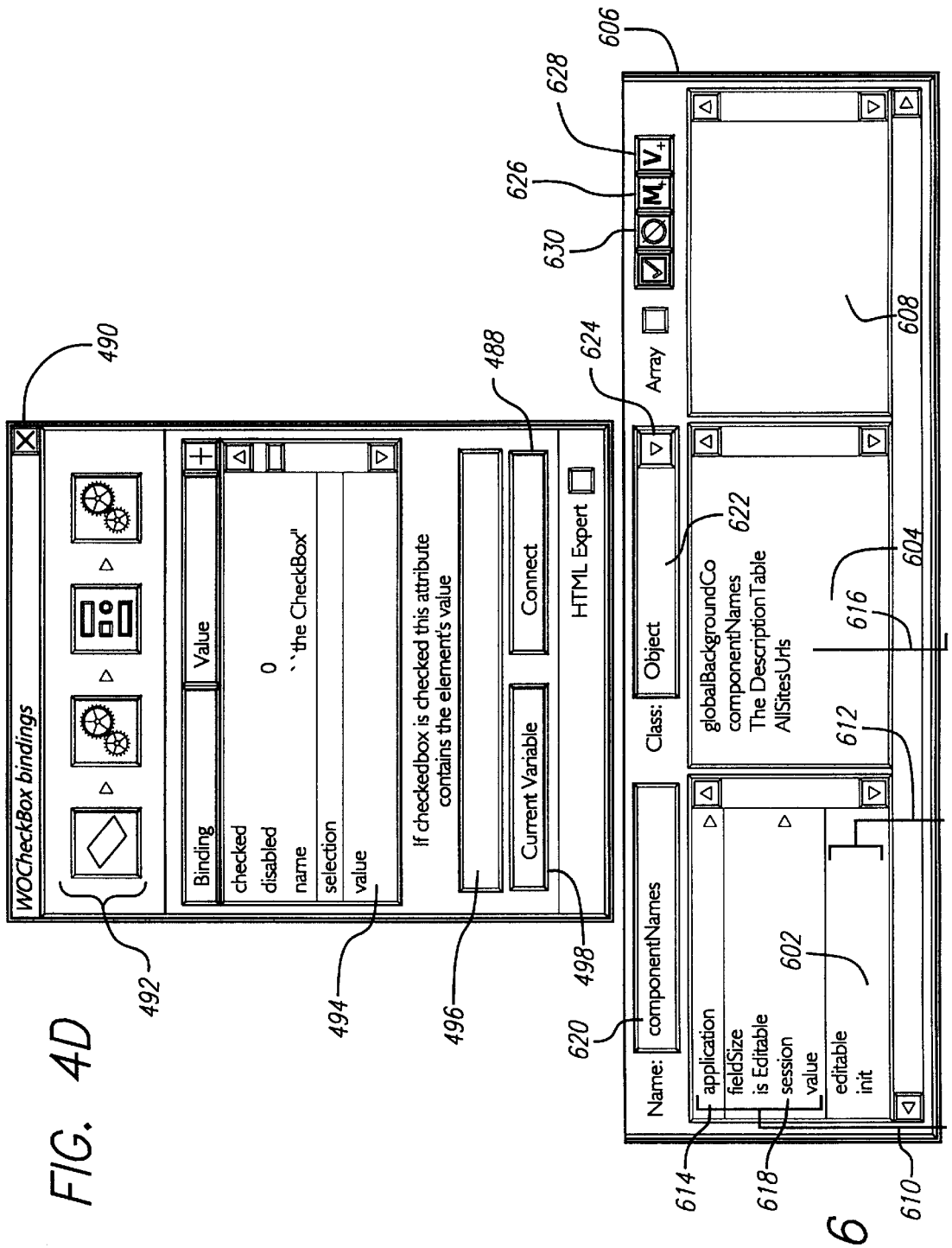

METHOD AND APPARATUS FOR BINDING USER INTERFACE OBJECTS TO APPLICATION OBJECTS

BACKGROUND OF THE INVENTION

1. Field of the Invention

This invention relates to binding user interface objects to application objects.

2. Background Art

Developing software applications to be used on the Internet is difficult and complex. There is a need for tools to make it easier for a software developer to create such applications. The problem in developing Internet applications can be understood by examining the Internet and current tools for creating programs.

The Internet is a worldwide network of interconnected computers. An Internet client accesses a computer on the network via an Internet provider. An Internet provider is an organization that provides a client (e.g., an individual or other organization) with access to the Internet (via analog telephone line or Integrated Services Digital Network line, for example). A client can, for example, download a file from or send an electronic mail message to another computer/client using the Internet. An Intranet is an internal corporate or organizational network that uses the same communications protocols as the Internet.

Internet Access

The World Wide Web (WWW) facilitates access to the Internet using several protocols including the Hypertext Transfer Protocol (HTTP). The WWW can be used to access text and other forms of information such as graphics, pictures, and sound. Components of the WWW include browser software, network links, and servers. The browser software, or browser, is a user-friendly interface (i.e., front-end) that simplifies access to the Internet. A browser allows a client to communicate a request without having to learn a complicated command syntax, for example. A browser typically provides a graphical user interface (GUI) for displaying information and receiving input. Examples of browsers currently available include Netscape's Navigator Gold 3.0 and Microsoft's Internet Explorer.

Information servers provide information on the WWW in response to a client request. Hypertext Transport Protocol (HTTP) is a standard protocol for communication with an information server on the WWW. HTTP provides communication methods that allow clients to request data from a server and send information to the server.

HTML Definitional Language

A browser displays information to a client/user as pages or documents. The Hypertext Markup Language (HTML) is used to define the format for a page to be displayed on the WWW. A WWW page is transmitted to a client as an HTML document. The browser executing at the client parses the document and generates and displays a page based on the information specified in the HTML document.

HTML is a structural language that is comprised of HTML elements that are nested within each other. An HTML document is a text file in which certain strings of characters, called tags, mark regions of the document and assign special meaning to them. These regions are called HTML elements. Each element has a name, or tag. Examples of elements include unordered lists, text boxes, check boxes, and radio buttons. Each of these elements can have attributes that specify properties of the element such as name, type, and value. The following provides an example of the structure of an HTML document:

```
<HTML>
    <HEAD>
        ... element(s) valid in the document head
    </HEAD>
    <BODY>
        ... element(s) valid in the document body
    </BODY>
</HTML>
```

Each HTML element is delimited by the pair of characters "<" and ">". The name of the HTML element is contained within the delimiting characters. The combination of the name and delimiting characters is referred to as a marker, or tag. Each element is identified by its marker. In most cases, each element has a start and ending marker. The ending marker is identified by the inclusion of a another character, "/", that follows the "<" character.

HTML is a hierarchical language. With the exception of the main HTML element which encompasses the entire HTML document, all other elements are contained within another element. The HTML element encompasses the entire document. The main HTML element identifies the enclosed text as an HTML document. The HEAD element is contained within the main HTML element and includes information about the HTML document. The BODY element is contained within the main HTML element. The BODY element contains all of the text and other information to be displayed. Other HTML elements are described in an HTML reference manual such as Scharf, D., *HTML, Visual Quick Reference,* Que Corporation (1995).

Mechanisms exist for developing Web applications that allow a user to interact with an application running on a remote processor as though the user's computer terminal was hardwired to the remote processor. That is, traditional networked applications are being ported to the Internet to allow remote access to the application via the Internet. The WebObjects product from NeXT Software, Inc. is an example of a set of tools that can be used to develop and run Web applications.

An application can be ported to the Web by creating HTML definitions for the application's user interface. A Web application exhibits a back-end state (e.g., stored data, runtime data, and logic). The HTML definitions that are used primarily for the application's user interface must be dynamic to reflect the changing back-end state. The back-end state must be able to be bound to the HTML definitions such that the application's logic can dynamically generate (or modify) the HTML definitions. The WebObjects product provides the ability to define the bindings in a plain text, or ASCII, file. The application developer writes a set of statements in a text file that are interpreted to determine the bindings. There is, however, no tool that provides an environment for interactively defining the bindings using a graphical user interface (GUI) and for generating the binding statements.

HTML allows hypertext links to be embedded in an HTML document that allow a user to interactively initiate transactions at server computers via the WWW. Minimal state information about such transactions is retained within an HTML document. It would be beneficial to use object-oriented HTML elements to manage a series of transactions and to maintain state information across transactions. It would be beneficial to be able to generate HTML documents dynamically using information from a previous transaction, corporate data, and data retained in HTML element objects. It would be beneficial to be able to share application development across applications.

As described more fully in U.S. patent application entitled Method and Apparatus for Generating Object-Oriented World Wide Web Pages, Ser. No. 08/515,057, filed on Aug. 14, 1995, assigned to the assignee of the present invention, and incorporated herein by reference, a capability exists for generating and manipulating WWW pages programmatically using object classes in an object-oriented environment. Classes of objects are defined for each HTML element. Properties of an HTML element are stored in instance variables of an object class. An object class can include methods to manipulate an HTML element. For example, an object class can include a method for generating the HTML for the element in a Web page definition.

Component

Self-contained modules, or components, are described in U.S. patent application entitled Method and Apparatus for Developing and Managing Transactions, Ser. No. 08/532,491, filed on Sep. 22, 1995, assigned to the assignee of the present invention, and incorporated herein by reference. Such a component can be used in one or more Web pages across multiple applications to provide definition for the Web page. A component can represent an entire page or some portion of a page.

Resources such as a template, association, and custom logic can be associated with a component. An HTML template, for example, can provide a layout or description of the Web page. An HTML template can include some or all of the HTML definition for the Web page, for example. The template can further identify a dynamic element that can be used to generate the definition for an HTML element. Like an HTML element specification in an HTML document, a dynamic element is identified using a tag. The dynamic element's entry in the template can further specify attributes for an instance of the object class.

Custom logic can be a program written in a script, Objective C, or other programming language that can be used to generate and control a Web page at runtime. For example, custom logic can generate an HTML definition for a requested Web page using an HTML template together with a runtime, or back-end, state of a client or server process. Thus, certain portions of the Web page can be defined prior to runtime while other portions are dynamically created at runtime.

Associations of a component can be used to provide a binding between the definitional elements (e.g., HTML elements) included in a Web page specification (e.g., HTML definition file) and the back-end state of a client or server process. For example, a text or ASCII file can be created using a text editor that contains statements that associate attributes of an HTML element with variables declared in the custom logic. Currently, a WWW application developer must specify these associations by writing statements using a declarative language syntax such as value=employee.fn where value is an attribute of an HTML element, employee is the variable and fn is a field of the employee variable. In the prior art, there is no mechanism for graphically specifying or viewing bindings between a Web page definition and custom logic.

SUMMARY OF THE INVENTION

A graphical user interface (GUI) and accompanying functionality for binding Web page definitional elements to a back-end state (e.g., client- or server-side back-end state) and custom logic is provided. A template containing definitional elements, custom logic, and bindings is generated that defines all or a portion of a Web page.

The GUI is used to define the layout of a Web page. Definitional elements (e.g., HTML elements) are specified for inclusion in the Web page. A set of variables and methods are defined using the invention. Variables have associated classes that are used to determine a default binding. Bindings between the definitional elements and the variables and methods is performed using the invention.

A definitional element can be bound to a variable, method or constant. A default binding can be determined between the definitional element and a variable based on the class of the variable. The definitional element's attribute that is used in the binding can be determined based on the variable's class. Certain attributes of a definitional element can be bound to a method or constant.

To bind a definitional element and a back-end state item, a definitional element is selected from the GUI. A back-end state item (e.g., variable, constant or method) is selected from the GUI either from a list of all items or a list of possible items. A default binding is determined between an attribute of the definitional element and the back-end state item. The default binding is displayed in the GUI for viewing by the user. In most cases, the attribute of the definitional element that is bound to the back-end state item can be displayed in the graphic representation of the definitional element. Since more than one attribute of a definitional element can be bound to the back-end state, the attribute that is fundamental to specifying the definitional element is displayed in the GUI. For example, the attribute that contains the value of a string or identifies the variable that stores a text field's input provides information that is fundamental to the specification of the string and text field definitional elements. A default binding is determined for a fundamental attribute of the definitional element and is displayed in the GUI. The user can change a default or other binding using an input screen referred to as an inspector. The inspector has input fields that can be used to input the definitional element, back-end state item and/or attribute to use in the binding. The inspector can be used to add arbitrary back-end state items in addition to the default bindings.

The invention can be used to bind a definitional element to data contained in a database. A displayGroup object used as a controller for enterprise objects can be bound to definitional elements in the Web page. Thus, data can be retrieved from one or more tables in a database and used to dynamically generate a Web page. Further, data can be retrieved from a Web page received from a Web application user and stored in the database.

BRIEF DESCRIPTION OF THE DRAWINGS

FIG. 4A provides an example of an application window according to an embodiment of the invention.

FIG. 4B provides an example of a palette containing HTML elements according to an embodiment of the invention.

FIG. 4D provides an example of an inspector window with bindings displayed according to an embodiment of the invention.

FIG. 6 provides an example of an object browser window containing variables and methods for a component.

DETAILED DESCRIPTION OF THE INVENTION

A method and apparatus for binding user interface objects to application objects is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
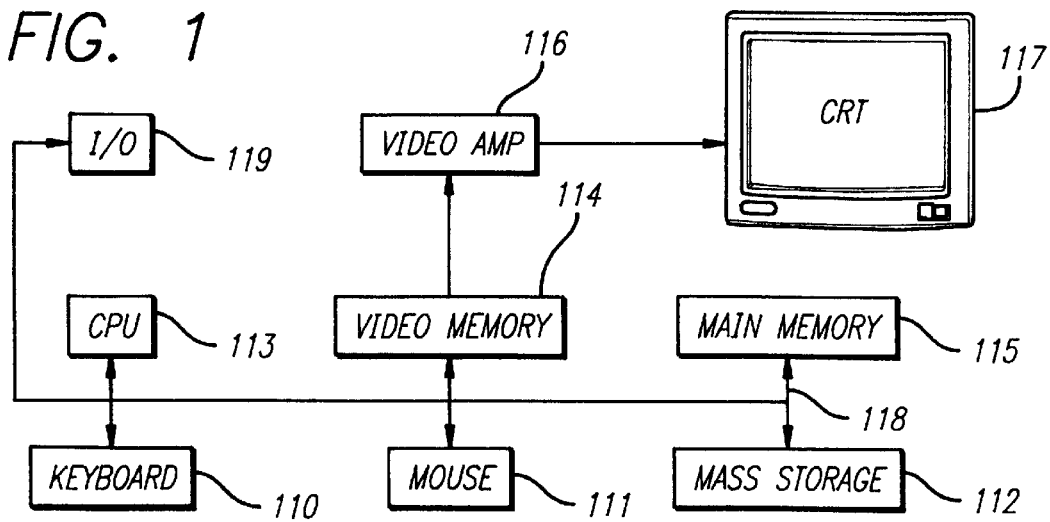
FIG. 1 provides an example of a general purpose computer that can be used with the present invention.

The present invention can be implemented on a general purpose computer such as illustrated in FIG. 1. A keyboard 110, mouse 111 and I/O 119 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplexed DATA/address lines may be used instead of separate DATA and address lines.

In the preferred embodiment of this invention, the CPU 113 is a 32-bit microprocessor manufactured by Motorola, such as the 680X0 or Power PC processor or a microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The invention may be implemented in any type of computer system or programming or processing environment.

The invention provides a mechanism for binding Web page definitional elements to a runtime, or back-end, state page using a graphical user interface (GUI). The GUI includes functionality to specify and view a Web page definition including definitional elements, back-end state of a client or server process, and bindings between the two. Functionality is provided for displaying a set of potential, default bindings using selections made by the GUI user (e.g., a Web application developer). Bindings can be made between definitional elements and elements of a database using the invention. Dynamic Web pages can be generated using data retrieved from a database. Further, input received from a Web page can be stored in a database.

Figure 2:
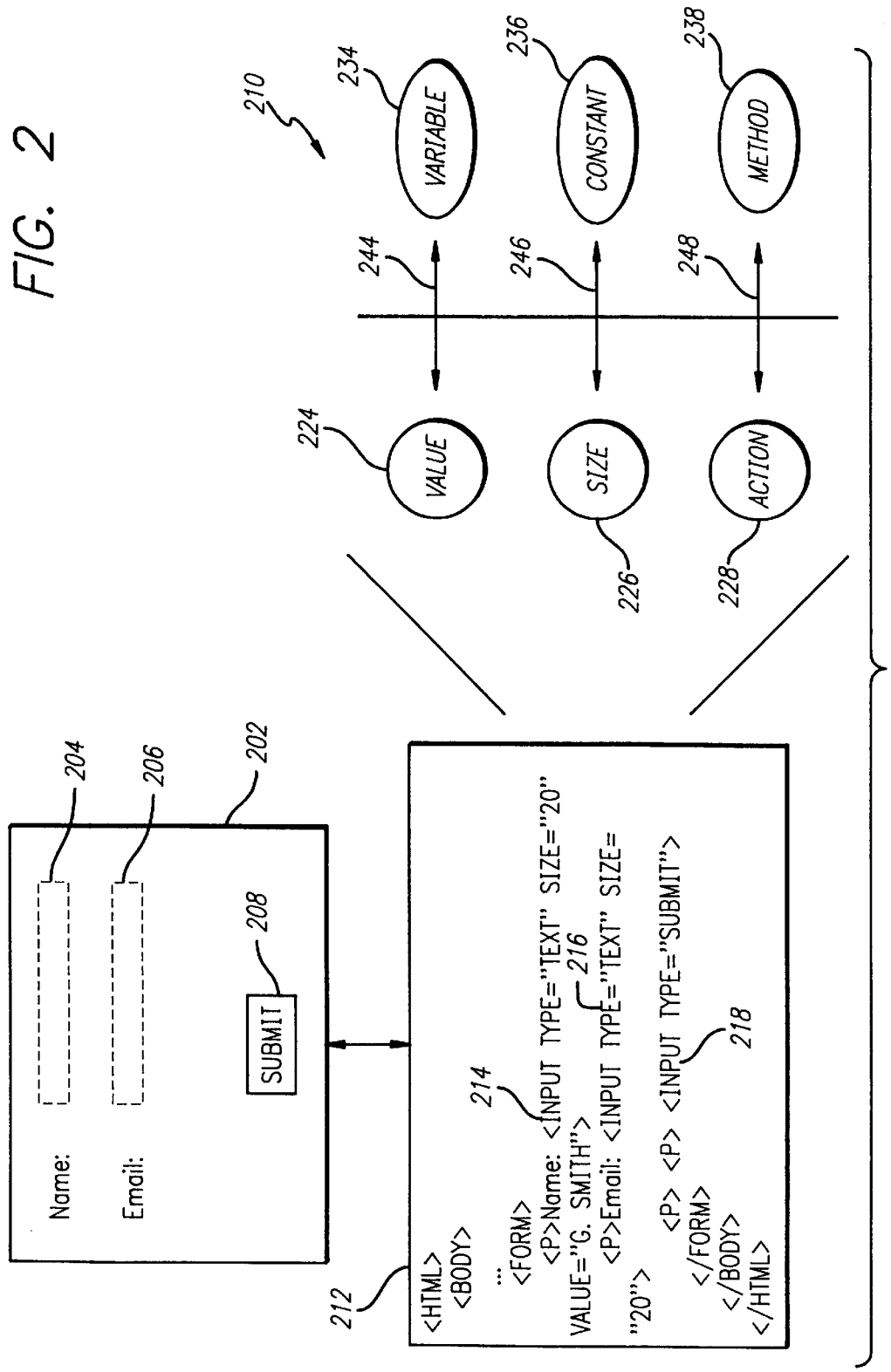
FIG. 2 provides an functional overview of an embodiment of the invention.

FIG. 2 provides an functional overview of an embodiment of the invention. Web page 202 contains fields such as input fields 204 and 206 and button field 208. Page 202 is displayed using a browser such as, for example, Netscape's Navigator browser or Microsoft's Internet Explorer. A browser displays page 202 from a definition such as definition 212. Definition 212 contains definitional elements (e.g., HTML elements) that are used by a browser to generate page 202. For example, element 214 contains a definition for input field 204. Element 214 specifies attributes for input field 204 such as the type of input ("TYPE='TEXT'") and size of the field (i.e., "SIZE ='20'"). The default value for field 204 is determined at runtime from back-end state 210. Elements 216 and 218 contain definitional information for fields 206 and 208.

Attributes of HTML elements 214–218 can be specified prior to runtime (e.g., statically defined). Other attributes may be defined at runtime from information contained in back-end state 210. Back-end state 210 includes data and logic such as variable 234, constant 236 and method 238. Attributes 224–228 are attributes of dynamic elements used to generate HTML elements. For example, attribute 224 is an attribute of a dynamic element that generates HTML element 214. HTML element 214 is the HTML definition for field 204. Attribute 224 is bound to variable 234 in back-end state 210. Variable 234 contains the default value that is displayed in field 204. Similarly, constant 236 is used to determine a size for input field 206, and method 238 provides an action that is performed when a submit input is received.

The invention is used to bind, or map, the back-end state to the definitional attributes. A binding is a mapping between one aspect of a dynamic element in a definition (e.g., an attribute) and the back-end state. A dynamic element is an element that is replaced with dynamically generated HTML at runtime. For a dynamic element to be fully functional, it must be bound to the back-end state. Bindings 244–248 bind, or map, elements 214–218 to back-end state 210. Input element 214 is bound (via binding 244) to variable 234. Binding 246 binds input element 216 to constant 236. Method 238 is bound (via binding 248) to input element 218.

Figure 3:
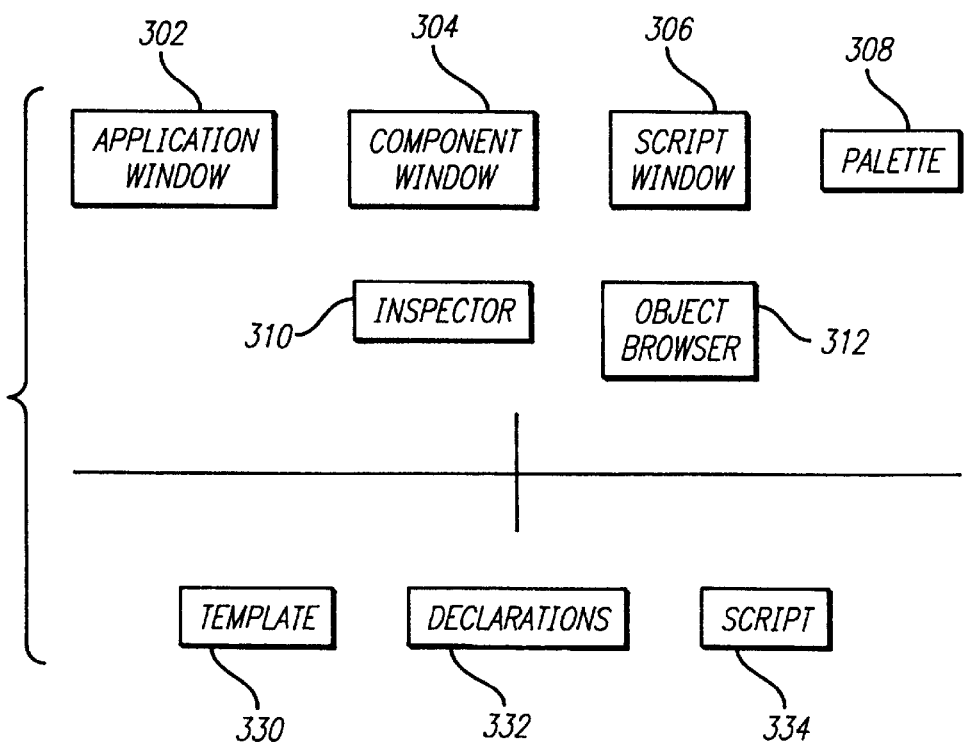
FIG. 3 provides an overview of the screens used in a GUI according to an embodiment of the invention.

The invention's functionality is used to create and manage bindings 244–248. A GUI is provided that is used to create, delete and modify bindings. FIG. 3 provides an overview of the screens used in a GUI according to an embodiment of the invention. The GUI is used to generate template 330, declarations 332 and script 334.

The GUI includes application window 302 that is used to control application-wide resources. It is used to open, create, or delete components inside an application as well as to define variables with global scope (e.g., application- and session-level variables). At runtime, application-level variables are created when an application starts executing and are deallocated when the application quits. A session-level variable is created when a new user begins a new session and is deallocated when the session ends. Application- and session-level variables can be accessed by an application's components. Component-level variables exist while the dynamic pieces of the component are being evaluated. After the component's page is redrawn, the back-end state contained in a component-level variable is lost.

FIG. 4A provides an example of an application window according to an embodiment of the invention. Application window 472 includes tabs 474, 476, and 478 to allow a user to select the level at which to perform functions. By selecting tab 474, functions are performed at the component level. When tab 474 is selected, a list of components (lines 480A–480G) is displayed to select a component upon which operations can be performed. Components can be added, deleted, modified and viewed. Application-level and session-level functions can be performed by selecting tabs 476 and 478, respectively. For example, it is possible to add, delete, modify or view application- or session-level variables by selecting tabs 476 or 478.

Multiple application windows can be opened at the same time in the GUI. For example, two instances of application window 472 can be opened that correspond to two different applications, application A and application B. A component that is used in application A can be reused in application B by selecting and dragging the component's graphical representation from application A's application window to application B's application window. The component is copied into application B. The component's HTML template, declarations, and script are copied into application B's directory. Further, a graphical representation of the component is displayed in application B's application window. Thus, a component that has already been defined in one application can be reused in another application using the GUI.

In the preferred embodiment, a component is reused without the need to copy it to an application's directory. Instead, a component can be shared that is placed in a location that is known to all applications. Thus, any application can access the component in that location. There is no need to copy the component to an application's directory. Multiple applications can share the same component (a portion of a component such as a template). Changes can be made to a single copy of the component. There is no need to update multiple copies of a component.

Referring to FIG. 3, object browser 312 is used to create, delete and modify application-, session-, and component-level variables. When it is used at the component-level, object browser 312 displays the full interface provided by a script file. Those items that are fully defined in the script file (e.g., a method that is filled out or a complete variable declaration) are displayed in object browser 312. Object browser 312 is used to bind dynamic elements to variables or methods in a script. Object browser 312 can also be used to display the interfaces of application- and session-level script files.

Component window 304, reached by selecting component table 474 and selecting or creating a component, provides an interface for creating, editing, and viewing a component. For example, component window 304 is used to add definitional elements, variables and methods to a component. Script window 306 shows a component's custom logic (e.g., a script or Java program). The contents of script window 306 can vary depending on the current definition level (e.g., application, session, and component). If application window 302 is open to define the application, script window 306 displays an application-level script. Similarly, if the session is being defined, script window 306 displays a session script. When component window 304 is open, script window 306 contains the component's script. The GUI includes an inspector window 310 that is used to display and modify binding, attributes and other settings.

Palette 308 contains elements that can be dragged into another window. For example, palettes 308 can include a window that contains a collection of definitional elements (e.g., HTML elements) that can be dragged and dropped into a component displayed in component window 304. FIG. 4B provides an example of a palette containing definitional elements according to an embodiment of the invention.

Icons 402, 404 and 406 represent different palette views that can be opened by, for example, clicking the icon. Icon 402 represents a static elements palette that contains static definitional elements. Static elements are elements that remain constant (i.e., are not modified at runtime). Icons 410–422 are examples of HTML static elements. Icon 410 represents a heading HTML element. The paragraph, list, HTML block, horizontal line, table, and link tags are represented by icons 412–422.

Dynamic elements can be displayed by selecting icons 404 and 406, respectively. Icon 404 represents form-based dynamic elements. A form-based dynamic element is an element that has an equivalent static element in the definitional language (e.g., has an HTML element equivalent). Icon 404 represents definitional elements such as HTML elements that can be defined or modified at runtime. A dynamic element is replaced or modified with dynamically generated definitional statements (e.g., HTML statements) at runtime. For example, a string element can be added to the definition of a page prior to runtime whose value will be determined at runtime. A static element can be transformed into a dynamic element by creating a binding for the element. If no binding is created, a static element (e.g., a static form-based element) is created. Preferably, when a binding is defined for a form-based element, an object class that is associated with the element is used to manipulate the element at runtime. For example, when a binding is defined for a text field, a textField object is created to provide attributes and behavior for the text field element at runtime.

Figure 4C:
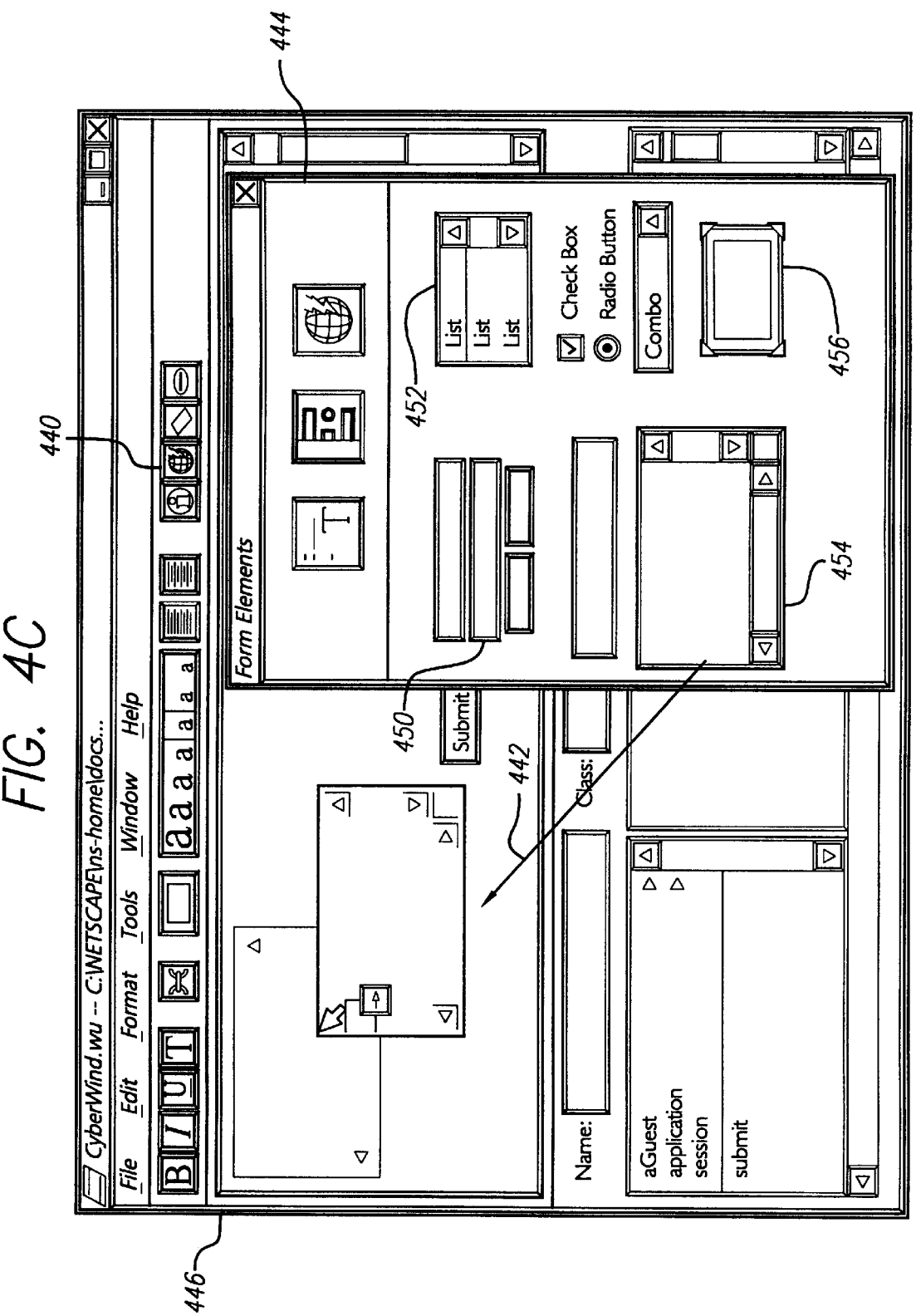
FIG. 4C provides an example of usage of a form-based dynamic element palette according to an embodiment of the invention.

FIG. 4C provides an example of a form-based dynamic element palette according to an embodiment of the invention. Icon 440 is selected to display palette window 444. Palette window 444 includes icons 450–456 that represent elements that can be dragged (e.g., in direction 442) from palette window 444 and dropped into another window (e.g., component window 446) to create a definitional element (e.g., HTML form element). HTML language statements are generated for the element.

Referring to FIG. 4B, icon 406 is used to open an abstract dynamic elements palette. An abstract dynamic element is an element that does not have a direct equivalent in the Web page definitional language. At runtime, an abstract element can be replaced by text or graphics or another definitional construct. A palette window can be opened to select an abstract element by selecting icon 406, for example. In addition to the static, form-based and abstract element palettes, it is possible to create custom palettes or to access a pre-existing custom palette.

The GUI is used to specify an initial definition and custom logic for Web page 202 and bindings between the two. In one embodiment, the initial definition is in the form of a text file (e.g., template 330) that contains a set of definitional statements such as HTML statements that identify an initial layout for Web page 202. Script 334 contains logic that can be executed at runtime. Script 334 can be defined using a scripting or compiled language, for example. Declarations 332 contains a set of bindings that associate elements specified in template 330 with the logic contained in script 334.

Component Window

Figure 5:
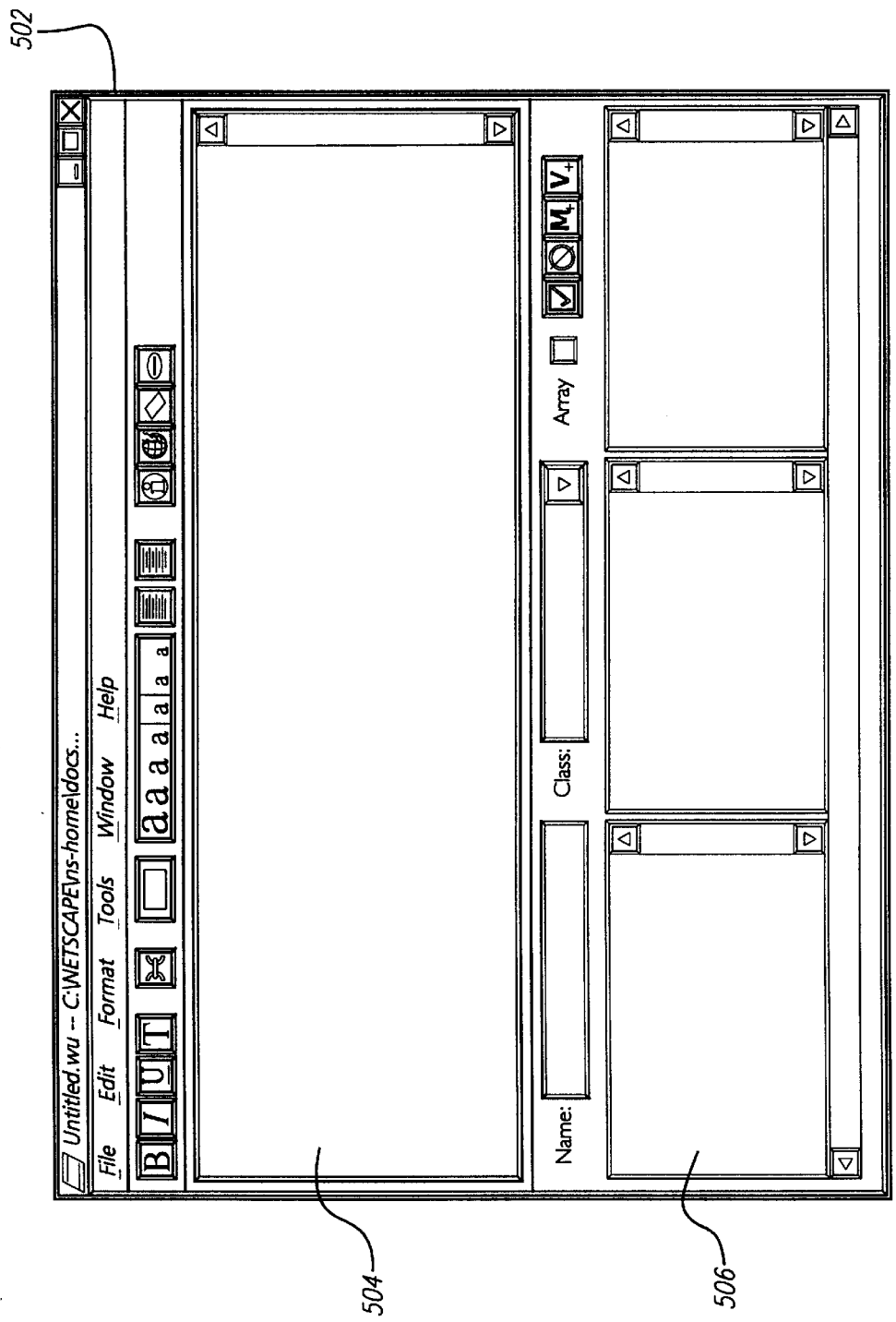
FIG. 5 provides an example of a component window according to an embodiment of the invention.

Component window 304 provides an interface for creating, editing, or viewing a component. For example, the interface can be used to add HTML elements, variables, and methods to a component. FIG. 5 provides an example of a component window according to an embodiment of the invention.

Component window 502 includes a element section 504 and an object browser 506. Element section 504 is used to add, remove, or modify definitional elements (e.g., HTML elements) to the component. As discussed above, palette window 308 contains definitional elements that can be selected for inclusion in a component. A graphical display of the definitional elements is provided in element section 504. Definitional elements displayed in element section 504 are used to generate template 330.

Object browser 506 is used to display variables or methods. FIG. 6 provides an example of an object browser containing variables and methods for a component. Columns 602, 604, and 608 are used to display variables and methods. For example, if object browser 606 is being used to display component-level information, column 602 contains the component's variables 610 and methods 612. Object browser 606 can also be used to display application-level or session-level variables. An instance of object browser 606 is displayed when tab 476 or 478 is selected in application window 472, for example. When line 614 of variables 610 (available in a component window) is selected, column 604 is used to display application-level variables 616. Similarly, if line 618 (available in a component window) is selected, session-level variables can be displayed in column 604.

Icons 626, 628, and 630 are used to create or delete a variable or method. For example, icon 630 is used to delete a variable (or method). To create a variable or a method, icons 628 and 626, respectively, are selected. The name of the variable (or method) being created is typed into field 620. The script is modified (e.g., variable or method declarations) in script window 306 in response to a create or delete operation.

A class can be specified for the variable using field 622 by either typing in a class or selecting a class from a menu that is displayed by pressing button 624. The class of a variable specifies the variable type. Preferably, a variable is identified as being one of three types of classes: base, composite, or enterprise object. A base class includes variables that represent or can be translated into a single value. The base classes are Object, Number, and String. A variable of the Number class represents a single number, and a variable of the String class represents a single string, for example.

The composite classes include dictionary and custom classes. A variable in the Dictionary class could represent all of the information about one item. The Enterprise Object classes are used in applications that access a database. A variable of type base, composite or enterprise object can also be an array of objects. The objects contained in the array are of the class selected for the variable. An array variable might represent a list of items.

Binding Elements

A binding is a mapping between a variable or method declared in a component's script (or other logic such as a function or method) and an attribute of a dynamic definitional element of the component. Each dynamic definitional element has one or more attributes. Each attribute of a dynamic definitional element can be bound to a variable or method in a script. It is not necessary to bind all of a dynamic definitional element's attributes, however. In one embodiment, the class of a variable is used to determine a default binding.

The GUI of the invention is used to specify a binding including specifying the variable (or method), the dynamic definitional element and the element's attribute. The invention facilitates binding by determining possible attributes of a definitional element for binding based on the variable selected. Further, given the definitional element and a variable, the invention identifies a default binding using an attribute of the definitional element. The variable's class is used to facilitate the identification of possible attributes of a definitional element to bind to the variable.

To bind a definitional element to a variable, a user:
1) selects a definitional element;
2) selects a variable (or method); and
3) selects an attribute of the selected definitional element to be bound to the selected variable.

Figure 7:
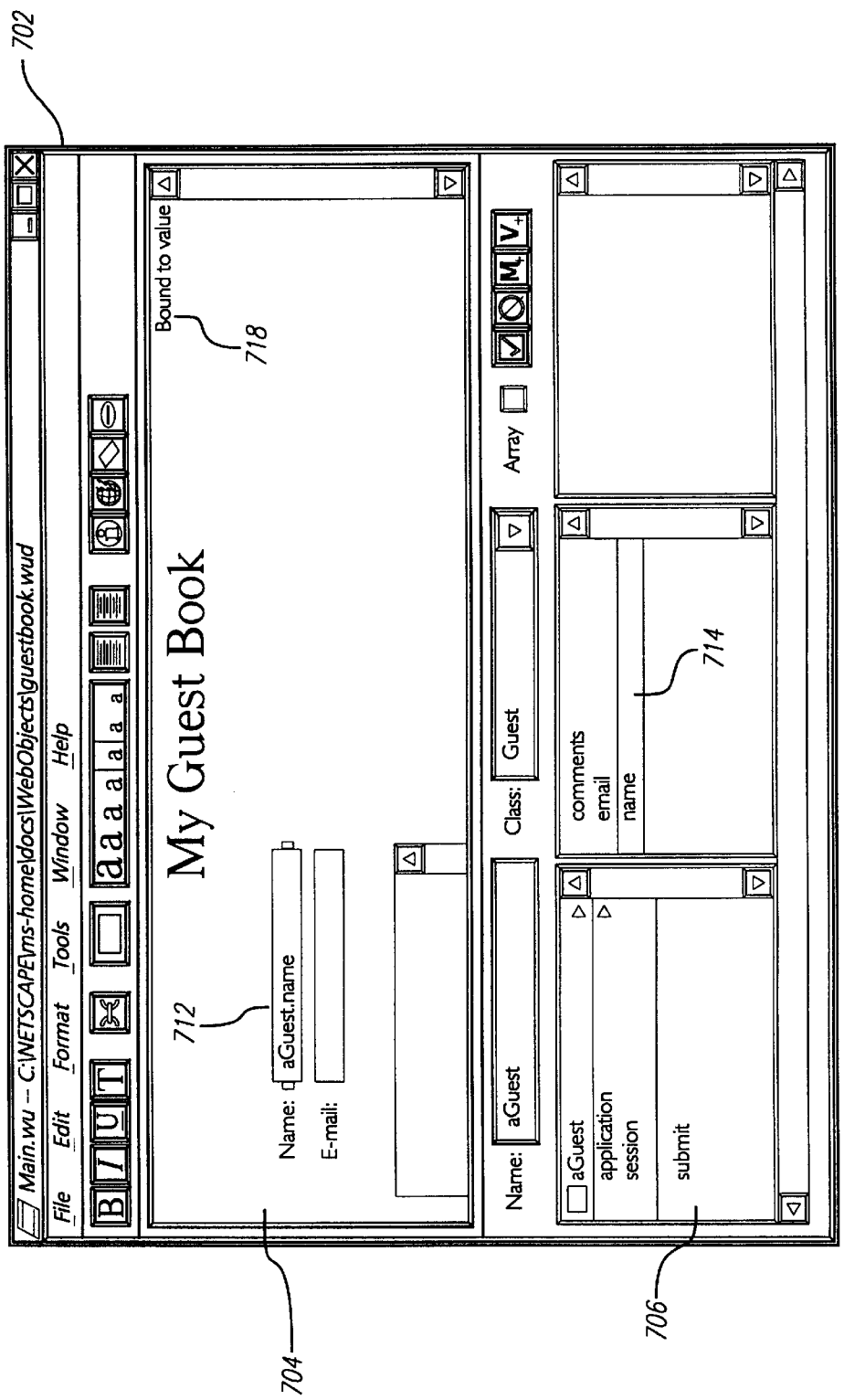
FIG. 7 provides an example of a graphical user interface screen used in a binding operation.

FIG. 7 provides an example of a graphical user interface screen used in a binding operation. Component window 702 contains definitional element section 704 and object browser 706. Definitional element section 704 contains field 712 which is a graphical representation of an HTML INPUT element. An HTML INPUT element includes name and value attributes. The user selects field 712 as the definitional element to be bound.

Object browser 706 contains a listing of variables (e.g., aGuest) and methods (e.g., submit) that can be selected for binding to the HTML INPUT element. The variable aGuest is a dictionary composite class variable that contains the variables: comments, email, and name. The user selects the name variable for binding to the HTML INPUT element. Based on this, the value attribute of the HTML INPUT element is bound to the name variable. The value attribute of the HTML INPUT in the component (i.e., field 712) is bound to the aGuest.name variable in the component's script.

At runtime, the value attribute of a dynamic element used to generate the HTML INPUT elements is bound to a variable that contains the default value for the input field. In field 712, the name field of the aGuest variable is used to specify the default value for the HTML INPUT element in the page in which the component is a part. At runtime, an HTML INPUT statement is generated, or modified, with the value contained in aGuest.name.

A binding is displayed in the GUI for review by the user. The graphical representation of the bound definitional element (e.g., field 712) identifies the bound variable (e.g., aGuest.name). Message 718 is displayed to identify the specific attribute of the definitional element that is bound to the variable.

In the previous example, the user selected the variable to be bound from a display of all variables and methods accessible to the component in the object browser. Alternatively, a pop-up menu can be used to display the possible variables that can be selected based on the selection of the definitional element. The GUI can display a pop-up window in the definitional element section that contains the variables that can be bound to the definitional element selected by the user. The user can select one of the variables contained in the pop-up window. The variables are chosen for inclusion in the pop-up menu based on their class relative to the definitional element that was selected.

More than one attribute of a definitional element can be bound to the back-end state. One or more attributes of a definitional element are considered to be fundamental to the definitional element's specification. For example, the attribute that contains the value of a string or identifies the variable that stores a text field's input provide information that is fundamental to the specification of the string and text field definitional elements. If a binding is determined for a fundamental attribute of the definitional element, it is displayed in the GUI.

Inspector window 310 can be used to specify the binding information. Inspector window 310 might be used to access an attribute including those that are not fundamental to a definitional element's specification or to specify a constant, for example. As a result of a binding to a constant declaration, the constant declaration is added to the bindings file.

FIG. 4D provides an example of an inspector window with bindings displayed according to an embodiment of the invention. Inspector window 490 displays the bindings, attributes, and other settings for the currently selected definitional element and other definitional elements. Definitional languages such as HTML are hierarchical languages. A definitional element is contained within another definitional element. The hierarchy is displayed in inspector window 490 using icons as hierarchy 492. The icons in hierarchy 492 represent a definitional element or a binding for a definitional element. Bindings section 494 displays the bindings (i.e., the attribute and a value to which it is bound) for a definitional element. A constant can be bound to an attribute by selecting the attribute, inputting a value in field 496, and pressing connect button 488. A variable can be bound to an attribute by selecting the variable, opening inspector 490, selecting an attribute, and pressing the current variable button 498.

Default Bindings

In addition to providing a GUI for defining a binding, the invention provides a mechanism for automatically identifying and displaying all of the possible variables that are available for binding to a definitional element. Further, an attribute, such as a fundamental attribute, of a definitional element selection can be automatically selected for binding with a selected variable. The automatic identification of a possible variable and/or attribute facilitates binding. The user is given those variables that can be bound to the definitional element. Further, it is not necessary for the user to select an attribute for binding to the variable.

The class of a variable is used in the identification of one or more attributes for binding. The attributes of a definitional element are compared with the class associated with a variable in the identification process. For example, a definitional element that is used to dynamically generate a string at runtime has a value attribute. The value attribute specifies the text that is to be displayed in the Web page. A string or other value or object that can be translated into a string would be a valid binding to the value attribute. Variables that have been defined as being in the base class (i.e., are an object, number or string) are compatible with the value attribute. Thus, these variables can be displayed as possible variables for binding with the string definitional element. Further, if a variable of a base class is selected, the value attribute (a fundamental attribute) of the string definitional element is automatically selected as the default binding attribute.

Binding Example

The following binding example is provided to illustrate binding using embodiments of the invention. The example assumes an object-oriented programming environment and the use of HTML as the definitional language. However, the capabilities and techniques illustrated can be applied in other programming environments other definitional languages. The example involves the development of a Web page for entering and displaying information about users in a guest book application. Users enter the name and email address in the input fields on a displayed Web page. The entered name and address are retrieved from the Web page and added to an array of guests. One guest or all entries in the guests array can be displayed on one or more Web pages.

Application window 302 can be used to create a main component for the Web page. Associated with the main component is an instance of each of template 330, declarations 332, and script 334. An instance of component window 304 is opened from application window 302. Since there is nothing at this point in template 330, the definitional element section (e.g., section 504) of component window 304 is initially empty. Instances of palette 308 can be used to drag and drop HTML elements into the main component.

Figure 8A:
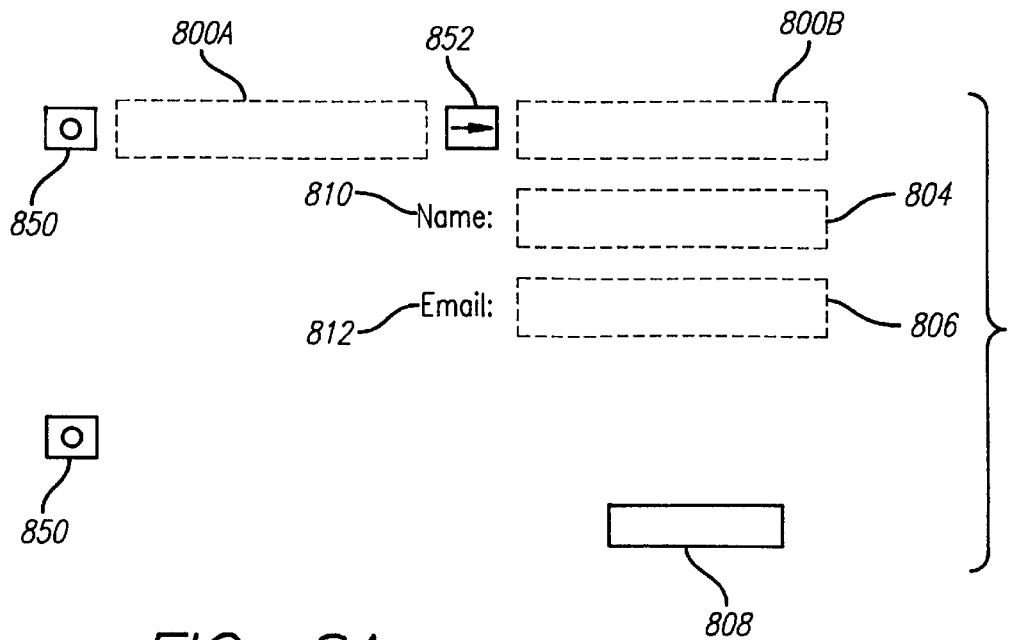
FIG. 8A provides an example of a definitional element section containing definitional elements according to one embodiment of the invention.
Figure 8C:
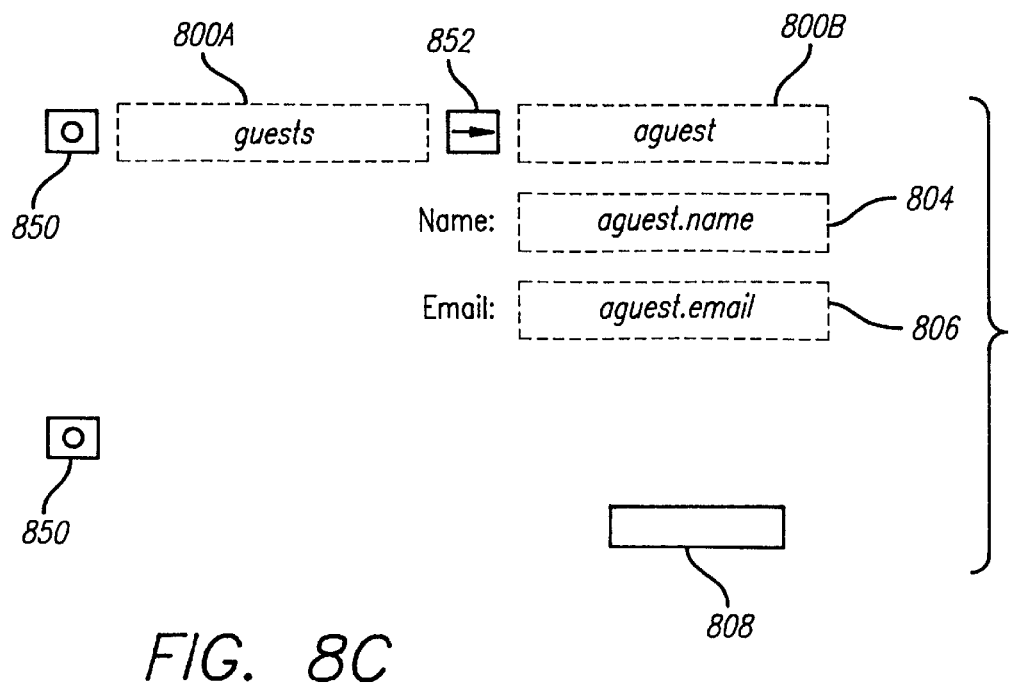
FIG. 8C displays examples of bindings according to an embodiment of the invention.
Figure 8B:
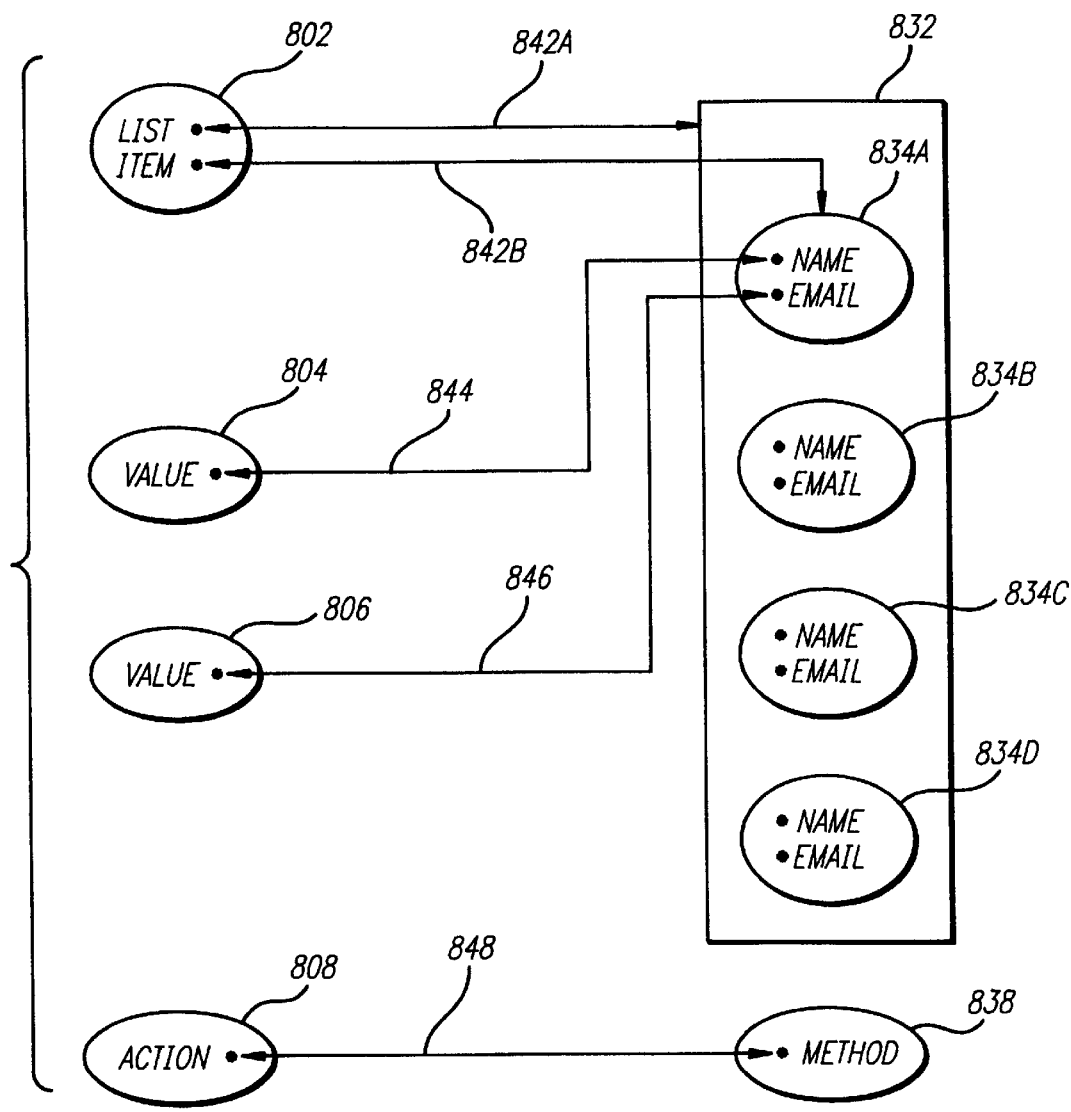
FIG. 8B illustrates variables and definitional elements in a guest application according to one embodiment of the invention.

FIG. 8A provides an example of a definitional element section containing definitional elements according to one embodiment of the invention. A repetition is illustrated between icons 850. The elements within icons 850 are repeated for each item in a repetition. A repetition element is an abstract dynamic element that does not directly correspond to an HTML element. A repetition element is used to generate HTML at runtime such as an ordered or unordered HTML list. A repetition element includes list attribute 800A and item attribute 800B (their connection is illustrated by icon 852). Referring to FIG. 8B, the list attribute identifies the array (e.g., array 832) of objects (e.g., objects 834A–834D) that repetition element 802 will iterate through. The item attribute identifies the current item (e.g., 834A) in the list array.

Referring to FIG. 8A, string element 804 and string element 806 are dynamic elements that generate HTML display strings at runtime. As indicated by static text 810 and 812, string elements 804 and 806 display a name and an email address. A string element is an abstract dynamic element that generates a text string. Submit element 808 is a form-based element that corresponds to the submit HTML element (i.e., an INPUT HTML element of type submit).

Variables are created to store back-end state information for the guest book application. FIG. 8B illustrates variables and definitional elements in the guest book application according to one embodiment of the invention. A custom class, guest, is created that is of class dictionary. A dictionary class has some similarity to a C language structure with fields. It contains a key (a name of the field) and a value for a key. The keys for objects of class guest are name and email. An application-level variable, guests (variable 832), is an array of objects of class guest that is created, using object browser 312, to store a list of guests. Object browser 312 is used to create a component-level variable, aguest, that is of class guest and stores current guest information.

The GUI is used to create a binding between elements 802–808 and the variables. To create a binding for repetition element 802, it is first selected. A variable, for example variable 832 (guests), is selected for binding to repetition element 802. Since variable 832 is an array in this embodiment, a default binding 842A is created between variable 832 and repetition element 802 using the list attribute of repetition element 802. A second binding, binding 842B, is created using the item attribute of repetition element 802 when variable 834A, aguest, and repetition element 802 are selected. Thus, repetition element 802 is bound to two different variables.

Variable 834A has name and email subfields that bind to string elements 804 and 806. Binding 844 is created between string element 804 and aguest.name (variable.834A) via the value attribute of string element 804. String element 806 is bound (binding 846) to aguest.email (variable 834A) via the value attribute of string element 806. Submit element 808 causes method 838 to be created in the main component's script. Method 838 can be viewed and modified using script window 306. For example, method 838 adds the information contained in the variable 834A (i.e., aguest variable) to the variable 832 (i.e., guests array variable). A default binding (binding 848) is created between method 838 and submit element 808 via its action attribute.

Bindings 842A–842B and 844–848 are default bindings. That is, they are created automatically given the class of the selected variable and the attributes of the selected element. The name and email subfields of variable 834A are of class object (a base class). Default bindings are created between these subfields and an attribute of string elements 804 and 806 that expects a value (i.e., the value attribute). The list attribute of repetition element 802 expects an array variable (e.g., variable 834A). The item attribute is an element of the list array. Once the list attribute is bound to an array of a specific type, the type of the item attribute can be determined. For example, when the list attribute is bound to an array of guests, an item attribute is a single guest. If a single guest is a dictionary variable of composite class (e.g., variable 832), the user can access the fields within the dictionary variable (e.g., name and email fields of the aguest variable)The action attribute of submit element 808 expects a method (e.g., method 838).

The bindings that are created are displayed in the GUI. FIG. 8C displays bindings according to an embodiment of the invention. The graphical representation of repetition element 802 is updated to be graphical representations 800A and 800B (in FIG. 8B). Graphical representation 800A reflects the binding of repetition element 802 to the guests variable (variable 832). Graphical representation 800B displays the binding between repetition element 802 and the aguest variable (variable 834A). Similarly, the variable names aguest.name and aguest.email are displayed in the GUI for string elements 804 and 806, respectively. The name of a bound method can be displayed in graphical representation 808.

At runtime, the information stored in the script variables and the scripts methods are used to dynamically generate the HTML definition for the main component. In a preferred embodiment, the HTML elements are instantiated as objects whose attributes include the definitional element's attributes. The objects' behavior is used to retrieve information to generate the Web page using the data stored in the script variables. In addition, the objects' behavior is used to retrieve information from the Web page for storage in the script variables. An objects' behavior can also be invoked in response to an action is taken in the Web page (e.g., the submit button is depressed).

Each of the variables or items in array 832 are processed using repetition element 802. Referring to FIG. 8B, repetition element 802 is bound to an array 832 and item is bound to a variable which is to be set with elements from the array (e.g., variable 834A) within array 832. Repetition element 802 advances a pointer to a current item in array 832. String element 804 accesses information contained in the current item of array 832 to generate or modify an existing HTML definition using the data contained in the array item. For example the name field of variable 834A is used by string element 804 to generate a name string. Similarly, the email field of variable 834A is used by string element 808 to generate an email string. The name and email strings are added to the HTML definition of Web page 850. When the HTML definition is complete, it is sent to the requesting browser for interpretation and display.

Web page 850 is displayed by the browser. A browser user can review the name and email information in fields 804 and 806. When Web page 850 is submitted using submit field 808, bindings 844 and 846 and method 838 can be used to store the input in the Web page 850 in the name and email subfields of back-end variable 834.

Binding Flow

Figure 9A:
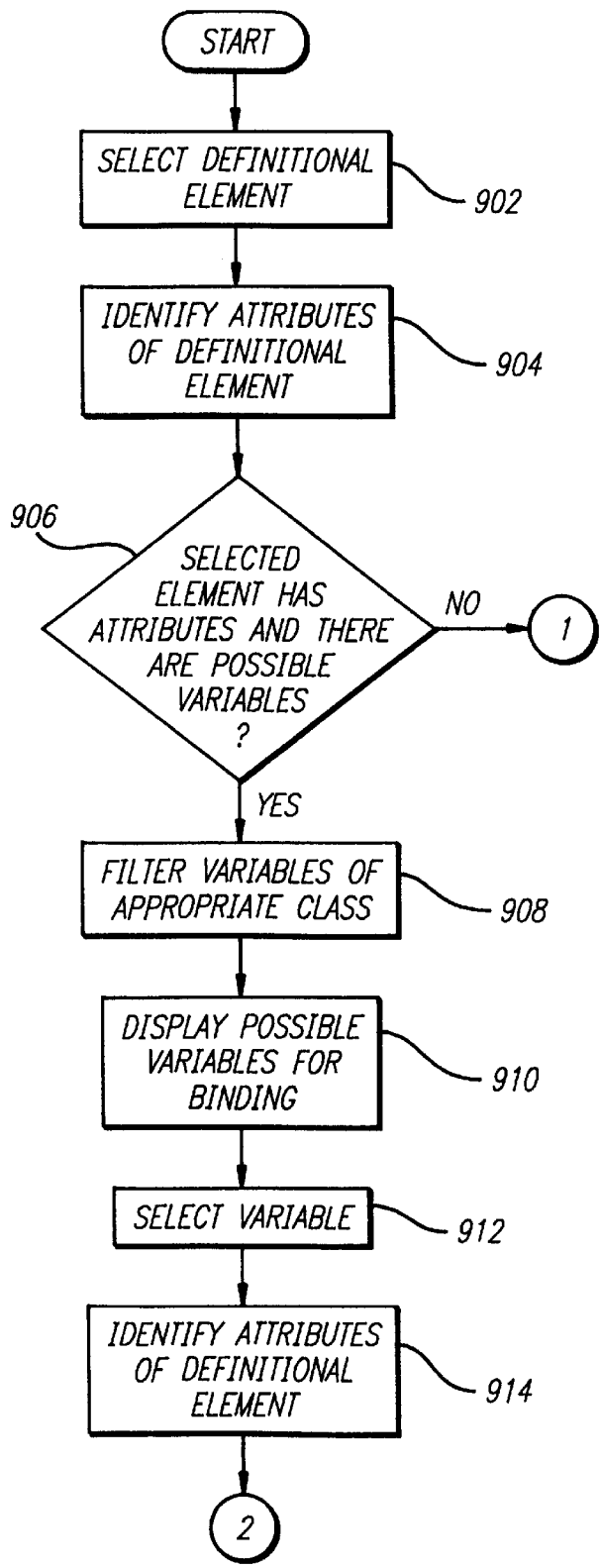
FIGS. 9A–9B provide a binding process flow according to an embodiment of the invention.
Figure 9B:
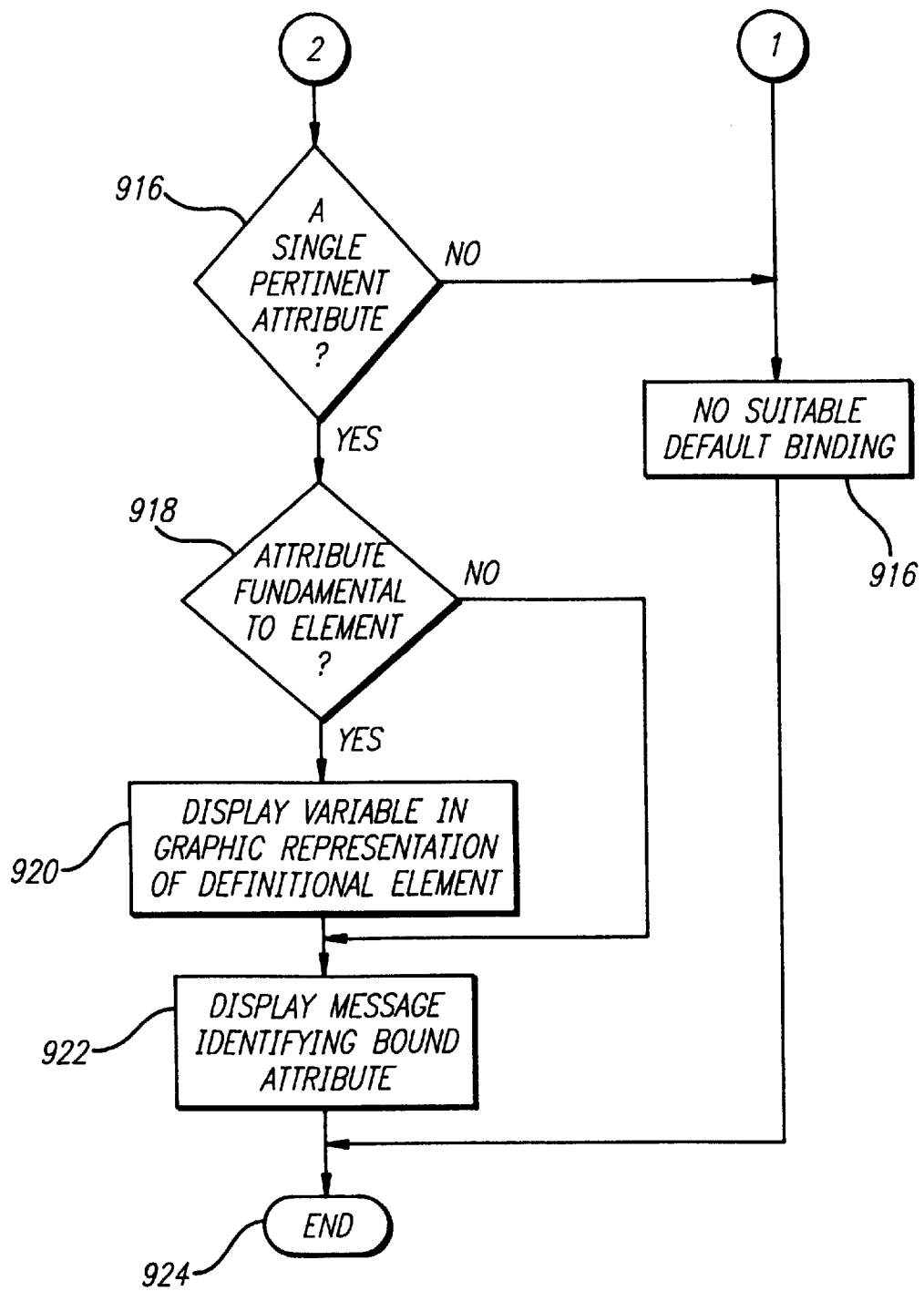

FIGS. 9A–9B provide a binding process flow according to an embodiment of the invention. At step 902, a definitional element is selected by the user. At step 904, the invention identifies the attributes of definitional element. At step 906 (i.e., "selected element has attributes and there are possible variables?"), a determination is made whether the selected definitional element has attributes to be bound and there are possible variables that can be bound to an attribute of the definitional element. If the selected definitional element does not have attributes for binding or there are no possible variables that can be bound to an attribute, processing continues at step 926 to indicate that there is no suitable default binding and processing ends at step 924.

If, at step 906, it is determined that there are attributes of the definitional element that can be bound to possible variables, processing continues at step 908. At step 908, the variables that can be bound to the definitional element are determined. The possible variables are displayed for review by the user, for example, in a pop-up menu at step 910. At step 912, the user selects a variable for binding. At step 914, attributes of the definitional element are identified that can be bound to the selected variable. At step 916 (i.e., a single pertinent attribute?") a determination is made whether there is one fundamental attribute that matches the selected variable. If there are zero or more than one such attribute, processing continues at step 926 to indicate that there is no suitable default binding. The user can elect to identify the attribute using Inspector 310.

If it is determined based on the class of the variable that there is a single pertinent attribute of the definitional element that can be bound to the selected variable, processing continues at step 918. At step 918 (i.e., attribute fundamental to element), a determination is made whether the attribute is a fundamental attribute. If so, processing continues at step 920 to display the variable in the GUI to identify it as being bound to the definitional element. If not, processing continues at step 922. At step 922, a message is displayed to identify the definitional element's attribute that was used in the binding. Processing ends at step 924.

The process flow in FIGS. 9A–9B use a pop-up menu or other interface widget to display those variables that can be bound to the selected definitional element. Alternatively, a user can specify a binding using inpsector window 310. In this case, the user selects a definitional element in step 902 and selects a variable as in step 910. The user selects an attribute of the selected definitional element to bind to the selected variable from inspector window 310.

Database Binding

In the guest book application, the guests array is populated from input received from users. A database can be the source of data that is used to populate the guests array. Fields of a database table can be bound to elements of a Web page such that data retrieved from a database is displayed in a Web page or data contained in a Web page is stored in a database.

Figure 10:
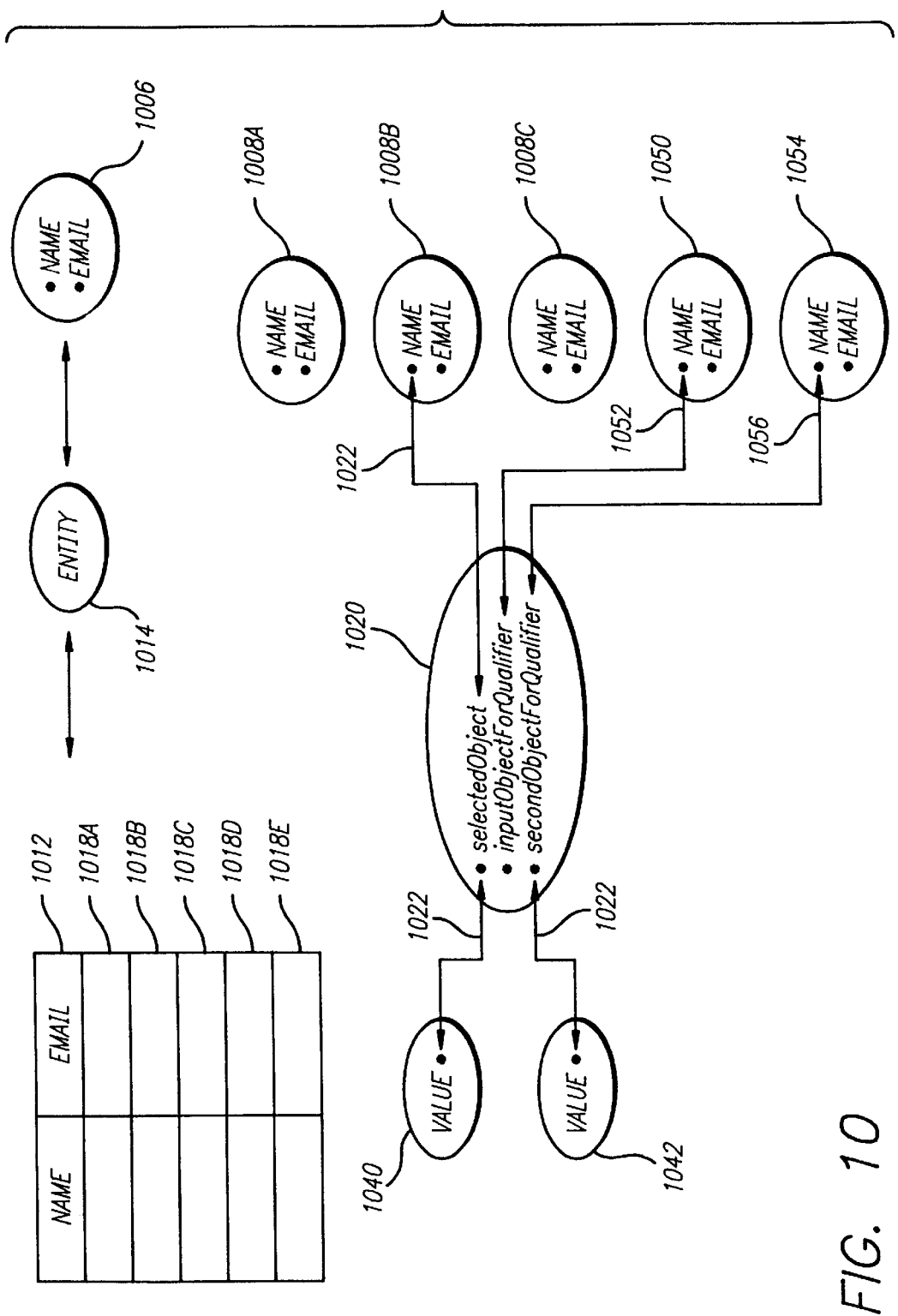
FIG. 10 provides an example of binding definitional elements to a database table according to an embodiment of the invention.

FIG. 10 provides an example of binding to a database table according to an embodiment of the invention. Table 1012 contains two columns, or fields: name and email. Entity 1014 maps table 1012 to an object class, class 1006. Entity 1014 can be created using a modeling application such as the EOModeler modeling application available from Apple Computer, Inc. Entity 1014 maps columns in table 1012 to attributes of class 1006. The mapping information provided by entity 1014 includes a mapping between the NAME column of table 1012 and the name attribute of class 1006. Similarly, the EMAIL column of table 1012 is mapped to the email attribute of class 1006.

Entity 1014 is stored as part of the application (e.g., the guest application). Data is fetched from table 1012 and stored in instances of class 1006. A custom class, called a displayGroup class, can manage for display instances of an object class mapped to the database. For example, an instance of the displayGroup class, displayGroup 1020, is created to manage for display the instances of class 1006. For example, objects 1008A–1008C are controlled by displayGroup 1020. Objects 1008A–1008C are instantiated using data from table 1012. Thus, for example, objects 1008A–1008C can contain the name and email information stored in rows 1018A–1018C (respectively) of table 1012. A description of object to databased mapping is provided in the Enterprise Objects Framework 2.0 Developer's Guide and is incorporated herein by reference.

The attributes or instance variables of class 1006 are displayed (e.g., in a component window) and can be bound to a definitional element as previously discussed. Thus, an attribute of a definitional element can be bound to an attribute of an object containing data from a data source such as a database (e.g., table 1012). As illustrated by line 1022, the binding is performed via the displayGroup object instance (e.g., displayGroup 1020).

The displayGroup class keeps track of all of the objects that it manages (e.g., allObjects). At runtime, the displayGroup monitors which object or objects are currently selected or displayed. A binding can be specified between an attribute of a definitional element and an attribute of an object class instance that is currently selected or being displayed. For example, a binding can be defined between the value attribute of element 1040 and the name attribute of an object that is currently selected (e.g., object 1008B where object 1008B is a selected object at runtime). Where displayGroup 1020 is referred to as guestDisplayGroup, the binding can be expressed as guestDisplayGroup.selectedObject.name.

The application developer can therefore bind dynamic elements of a Web page to attributes or instance variables of objects that are held by the displayGroup. In addition, a dynamic element can be bound to a method of displayGroup 1020. For example, a method of displayGroup 1020 such as displayObjects can be bound to a repetition element. The following provides examples of possible methods of displayGroup 1020 grouped by the type of operation they perform:

Display Results Methods

The "Display Results" methods give access to database objects and allow them to be displayed:

allObjects: All of the objects managed for display by displayGroup.

displayedObjects: The subset of allObjects.

selectedObjects: The objects in the current selection.

selectedObject: A single selected object.

Managing Batches Methods

The application developer can specify the number of records that are displayed on a Web page by setting numberOfObjectsPerBatch. Based on the numberOfObjectsPerBatch setting, the displayGroup changes the subset of allObjects for display (i.e., displayedObjects). The size of the subset is determined by the batch size specified (e.g., by the application developer). For example, if the numberOfObjectsPerBatch is set to five, displayedObjects initially identifies the first five objects in the set of allObjects as the displayed objects. The displayNextBatch results in the next five objects of the set of allObjects being identified as the displayedObjects.

The following are examples of batch methods:

displayPreviousBatch: Select the previous batch of objects and then reloads the page.

displayNextBatch: Selects the next batch of objects and then reloads the page.

batchCount: The number of batches to display.

currentBatchIndex: The number of the batch currently displayed where 1 is the first batch displayed.

numberOfObjectsPerBatch: The number of objects that can be displayed in a Web page.

Query Methods

The displayGroup object class can be used to construct and invoke a query on the information contained in a database. A query-by-example interface is used to specify the query. To construct a query in the guest application, for example, an empty form is displayed that contains a name and email address input field for entering guest information. A template object instance that is not tied to a row in the database is used to store input entered into an input field. The template object instance can be thought of as a dictionary of key value pairs.

The keys or properties of a template object instance are bound to attributes of a definitional element. For example, if a value attribute of a definitional element used to generate an input field of an input form is bound to a property of a template object such as name and a user enters a value in the field, the user input is stored in the template object as name. To construct a query, the displayGroup instance (e.g., guestDisplayGroup) accesses the information stored in the template object to construct a qualifier (e.g., selection criteria) for use in querying the database (e.g., table 1012).

Methods of the displayGroup (e.g., inputObjectForQualifier and secondObjectForQualifier) return a template object to which the user interface fields can be bound. When either the inputObjectForQualifier or secondObjectForQualifier is selected in object browser 312, the attributes of a template object are displayed (e.g., the name and email attributes of template object 1050 are displayed when inputObjectForQualifier is selected). In defining the input form, elements 1040 and 1042 are created as a textField definitional elements that generate HTML INPUT fields at runtime.

Elements 1040 and 1042 are bound to template objects 1050 and 1052 via displayGroup 1020. Where displayGroup is named guestDisplayGroup, the bindings are expressed as (respectively):

"guestDisplayGroup.inputObjectFor Qualifier.name"

"guestDisplayGroup.secondtObjectForQualifier.name"

The bindings are shown graphically in FIG. 10. The value attributes of elements 1040 and 1042 are bound to the name attributes of template objects 1050 and 1052 (respectively). Template objects 1050 and 1052 is used to store input entered into an input fields and are not tied to records in table 1012.

When all query fields having values are only in inputObjectForQualifier (i.e., none in secondObjectForQualifier), a qualifier is constructed using equality or LIKE pattern matching. For example, when a value is specified for a name attribute of element 1040, a select statement is generated that includes the clause "where name=user input." A pattern such as "%@*" can be specified for the displayGroup. The pattern is used to generate the where clause for string pattern matching. The "%@" portion of the pattern specifies the location of the user input and the "*" is a wild card. Thus, the pattern is "user input*". For example, if the user input is Bill, the where clause that is constructed is using the "%@*" pattern matching is "where name LIKE Bill*". Where more than one attribute of a template object has a value, a where clause is constructed that tests for each attribute that has a value.

A range (i.e., "from" "to") can be specified by binding two template objects to two definitional elements. For example, inputObjectForQualifier is bound to one definitional element and secondObjectForQualifier is bound to a second definitional element. Referring to FIG. 10, element 1040 is bound to a template object 1050 and element 1042 is bound to element 1054 via displayGroup 1020. When a user inputs a "from" name using the input field of element 1040, the value is stored in template object 1050. A "to" name input using the input field of element 1042 is stored in template object 1054. The executeQuery method constructs a selection criteria that specifies a range using the "from" and "to" name values. For example, if the name attributes of template objects 1050 and 1054 contain the values "Jones" and "Smith", the where clause that is generated is "where name>"Jones" and name<"Smith".

The following are examples of methods used to perform queries:

executeQuery: Builds a qualifier using inputObjectForQualifier and the pattern matching set in the displayGroup options panel, and fetches the records that match the qualifier.

inputObjectForQualifier: Returns an entity object that is used to create the qualifier.

secondObjectForQualifier: Used for from-to queries to specify the "to" value.

Database Modification Methods

The following are examples of methods used to modify the database:

insert: Adds a new empty record.

delete: Deletes the selected records.

A displayGroup is associated with a change tracking object. The change tracking object monitors the changes that are made to the data. To perform a commit, the displayGroup instance sends a save request to the change tracking object. The changed data stored in an object is written to the database.

Thus, a method and apparatus for binding user interface objects to application objects has been provided.

What is claimed is:

1. A method for specifying a binding between a user interface element in a Web page and a back-end state item of a Web page application using a graphical user interface (GUI) executing in a computer system comprising:

displaying in an element palette of said GUI, wherein said element palette is user defined, a Hypertext Markup Language (HTML) user interface element, said HTML user interface element being associated with an object class having a plurality of attributes and behavior for generating a Hypertext Markup Language (HTML) definition for said HTML user interface element;

dragging said HTML user interface element from said user defined element palette into a first window of said GUI to include said user interface element in the definition of a Web page;

displaying a graphical representation of said HTML user interface element in said first window of said GUI;

displaying in a second window of said GUI one or more variables of a back-end state of a Web page application that are compatible with said object class;

selecting one of said one or more variables for dynamic binding to said object class;

determining whether there is a single attribute of said object class that is fundamental to the definition of said HTML user interface element;

performing (a)–(c) if said single attribute exists:

(a) creating a binding between said single attribute and said one of said one or more variables;

(b) displaying in said graphical representation of said HTML user interface element said one of said one or more variables;

(c) displaying in said GUI the name of said single attribute; and saving said binding as a part of a definition of said Web page.

2. A method of binding a user defined user interface (UI) element of an application to a back-end state item comprising:

generating in a graphical user interface (GUI) a graphical representation of said user defined UI element, said user defined UI element configured to generate Hypertext Markup Language (HTML) statements at runtime;

inserting said graphical representation of said user defined UI element into a window of said application in said GUI, said user defined UI element is inserted unbound to a back-end state item of said application;

identifying in said GUI a back-end state item to bind to said user defined UI element;

creating a dynamic binding between said user defined UI element and said back-end state item; and displaying in said GUI a representation of said dynamic binding between said user defined UI element and said back end state item.

3. The method of claim 2 wherein said back-end state item comprises a variable.

4. The method of claim 2 wherein said back-end state item comprises a constant.

5. The method of claim 2 wherein said back-end state item comprises logic of said application.

6. The method of claim 2 wherein said identifying further comprises:

identifying a class of said back-end state item.

7. The method of claim 6 wherein said user defined UI element includes at least one attribute, and wherein creating said dynamic binding further comprises:

binding said at least one attribute to said back-end state item one of said one or more components when said at least one attribute and said class are compatible.

8. The method of claim 2 wherein said user defined UI element includes at least one attribute, said identifying said back-end state item further comprises:

determining using said at least one attribute of said user defined UI element a list of back-end state items that are compatible with said attribute, said list including said back-end state item; and selecting said back-end state item from said list of back-end state items.

9. The method of claim 2 wherein said back-end state item object is a controller object used to control a plurality of data-bearing objects having data retrieved from a database, and wherein creating said dynamic binding further comprising:

binding said user defined UI element to a component of said controller object.

10. The method of claim 9 wherein said component is a method of said controller object.

11. A method of dynamically binding a user defined user interface (UI) object to a back-end state comprising:

generating a graphical user interface (GUI) displaying back-end state items and a user defined UI object capable of generating Hypertext Markup Language (HTML) statements at runtime;

in said GUI, creating a dynamic binding between said UI object and a first back-end state item;

in said GUI, creating a dynamic binding between said UI object and a second back-end state item;

displaying in said GUI a representation of said dynamic bindings between said user defined UI object and said first and second back-end state items.

12. The method of claim 11 wherein said steps of creating said dynamic binding further comprise:

selecting a representation of said user defined UI object displayed in said GUI;

selecting a representation of one of said back-end state items displayed in said GUI; and binding an attribute of said UI object and said one of said back-end state items when said attribute of said UI object is compatible with said one of said back-end state items.

13. The method of claim 11 wherein said user defined UI object includes at least one attribute, said steps of creating said dynamic binding further comprise:

determining using said at least one attribute of said user defined UI object a plurality of said back-end state items that are compatible with said at least one attribute;

generating a display of said plurality of said back-end state items one or more components in said GUI; and selecting a back-end state item from said plurality of back-end state items for dynamic binding to said at least one attribute of said user defined UI object.

14. The method of claim 11 wherein said steps of creating said dynamic binding further comprise:

selecting a representation of a back-end state item displayed in said GUI; and generating a display that includes one or more attributes of said user defined UI object in said GUI; and creating a dynamic binding between said user defined UI object and said back-end state item component when one of said one or more attributes is selected.

15. A computer system for creating said dynamic binding a user defined user interface (UI) object and a back-end state comprising:

a graphical user interface (GUI) displayed by a computer system including:

graphical representations of user defined UI objects, said user defined UI objects capable of generating Hypertext Markup Language (HTML) statements at runtime;

representations of back-end state items object of an said application; and program code executing in said computer system configured to add one of said user defined UI objects to said application, said one of said user defined UI objects unbound to any of said back-end state items, said program code further configured to receive and display in said GUI at least one dynamic binding specification between said one of said user defined UI objects and one of said back-end state items.

16. The computer system of claim 15 wherein said dynamic binding specification identifies an attribute of said one of said user defined UI objects being bound to said one of said back-end state items.

17. The computer system of claim 15 wherein said program code identifies a plurality of back-end state items objects that are capable of being bound to said one of said user defined UI objects from which said one of said back-end state items objects is selected for dynamic binding to said one of said user defined UI objects.

18. An article of manufacturing comprising:

a computer usable medium having computer readable program code embodied therein for dynamically binding a user defined user interface (UI) element of an application to a back-end state item comprising:

computer readable program code configured to cause a computer to generate in a graphical user interface (GUI) a representation of said user defined UI element, said user defined UI element capable of generating Hypertext Markup Language (HTML) statements at runtime;

computer readable program code configured to cause a computer to insert said representation of said user defined UI element into a window of said application in said GUI, said user defined UI element is inserted unbound to any back-end state items of said application;

computer readable program code configured to cause a computer to identify in said GUI a back-end state item to bind to said user defined UI element;

computer readable program code configured to cause a computer to create a dynamic binding between said user defined UI element and said back-end state item; and computer readable program code configured to cause a computer to display in said GUI a representation of said dynamic binding between said user defined UI element and said back-end state item.

19. The article of manufacture of claim 18 wherein said computer readable program code configured to cause a computer to identify further comprises:

computer readable program code configured to cause a computer to identify a class of said back-end state item.

20. The article of manufacture of claim 19 wherein said user defined UI element includes at least one attribute, said computer readable program code configured to cause a computer to bind further comprises:

computer readable program code configured to cause a computer to bind at least one attribute of said user defined UI element to said back-end state item when said at least one attribute and said class are compatible.

21. The article of manufacture of claim 18 wherein said user defined UI element includes at least one attribute, said computer readable program code configured to cause a computer to identify said back-end state item object further comprises:

computer readable program code configured to cause a computer to determine using said at least one attribute of said user defined UI element a plurality of said back-end state items objects that are compatible with said at least one attribute; and computer readable program code configured to cause a computer to select said back-end state item from said plurality of said back-end state items.

22. The article of manufacture of claim 18 wherein said back-end state item is a controller object used to control a plurality of data-bearing objects having data retrieved from a database, said computer readable program code configured to cause a computer to create a dynamic binding further comprises:

computer readable program code configured to cause a computer to bind said user defined UI element to a component of said controller object.

23. An article of manufacturing comprising:

a computer usable medium having computer readable program code embodied therein for dynamically binding a user defined user interface (UI) to a back-end state item of an application comprising:

computer readable program code configured to cause a computer to generate a graphical user interface (GUI) displaying back-end state and a user defined UI object capable of generating Hypertext Markup Language (HTML) statements at runtime;

computer readable program code configured to cause a computer to create a dynamic binding in said GUI said user defined UI Object to a first back-end state item; and computer readable program code configured to cause a computer to create a dynamic binding in said GUI said user defined UI object to a second back-end state item;

computer readable program code configured to cause a computer to display in said GUI a representation of said dynamic binding between said user defined UI object and said first and second back-end state items.

24. The article of manufacture of claim 23 wherein said computer readable code configured to cause a computer to create a dynamic binding further comprises:

computer readable program code configured to cause a computer to select a representation of said user defined UI object displayed in said GUI;

computer readable program code configured to cause a computer to select a representation of one of said back end state items displayed in said GUI; and computer readable program code configured to cause a computer to bind an attribute of said user defined UI object and said one of said back-end state items when said attribute of said user defined UI object is compatible with said one of said back-end state items.

25. The article of manufacture of claim 23 wherein said user defined UI object includes at least one attribute, said computer readable code configured to cause a computer to create a dynamic binding further comprises:

computer readable program code configured to cause a computer to determine using said at lest one attribute of said user defined UI object a plurality of said back-end state items that are compatible with said at least one attribute;

computer readable program code configured to cause a computer to generate a display of said plurality of said back-end state items in said GUI; and computer readable program code configured to cause a computer to select a back-end state item from said plurality of said back-end state items for dynamically binding to said at least one attribute of said user defined UI object.

26. The article of manufacture of claim 23 wherein said computer readable code configured to cause a computer to create a dynamic binding further comprises:

computer readable program code configured to cause a computer to select a representation of a back-end state item displayed in said GUI;

computer readable program code configured to cause a computer to generate a display that includes one or more attributes of said user defined UI object in said GUI; and computer readable program code configured to cause a computer to bind said user defined UI object and said back-end state item when one of said one or more attributes is selected.

\* \* \* \* \*